INVENTOR
Anatole Minc
BY
Pennie, Edmonds, Morton, Taylor and Adams
ATTORNEYS

Sept. 6, 1966 A. MINC 3,271,588

DIGITAL KEYER FOR CONVERTING D.C. BINARY SIGNALS INTO TWO DIFFERENT OUTPUT AUDIO FREQUENCIES

Filed Aug. 7, 1963 3 Sheets-Sheet 2

INVENTOR
Anatole Minc
BY Pennie, Edmonds, Morton, Taylor and Adams
ATTORNEYS

Sept. 6, 1966 A. MINC 3,271,588

DIGITAL KEYER FOR CONVERTING D.C. BINARY SIGNALS INTO TWO DIFFERENT OUTPUT AUDIO FREQUENCIES

Filed Aug. 7, 1963 3 Sheets-Sheet 3

INVENTOR
Anatole Minc
BY
Pennie, Edmonds, Morton, Taylor and Adams
ATTORNEYS

United States Patent Office 3,271,588
Patented Sept. 6, 1966

3,271,588

DIGITAL KEYER FOR CONVERTING D.C. BINARY SIGNALS INTO TWO DIFFERENT OUTPUT AUDIO FREQUENCIES

Anatole Minc, Upper Brookville, N.Y., assignor to Tele-Signal Corporation, Hicksville, N.Y., a corporation of New York Filed Aug. 7, 1963, Ser. No. 300,604
4 Claims. (Cl. 307—88.5)

Figure 1:
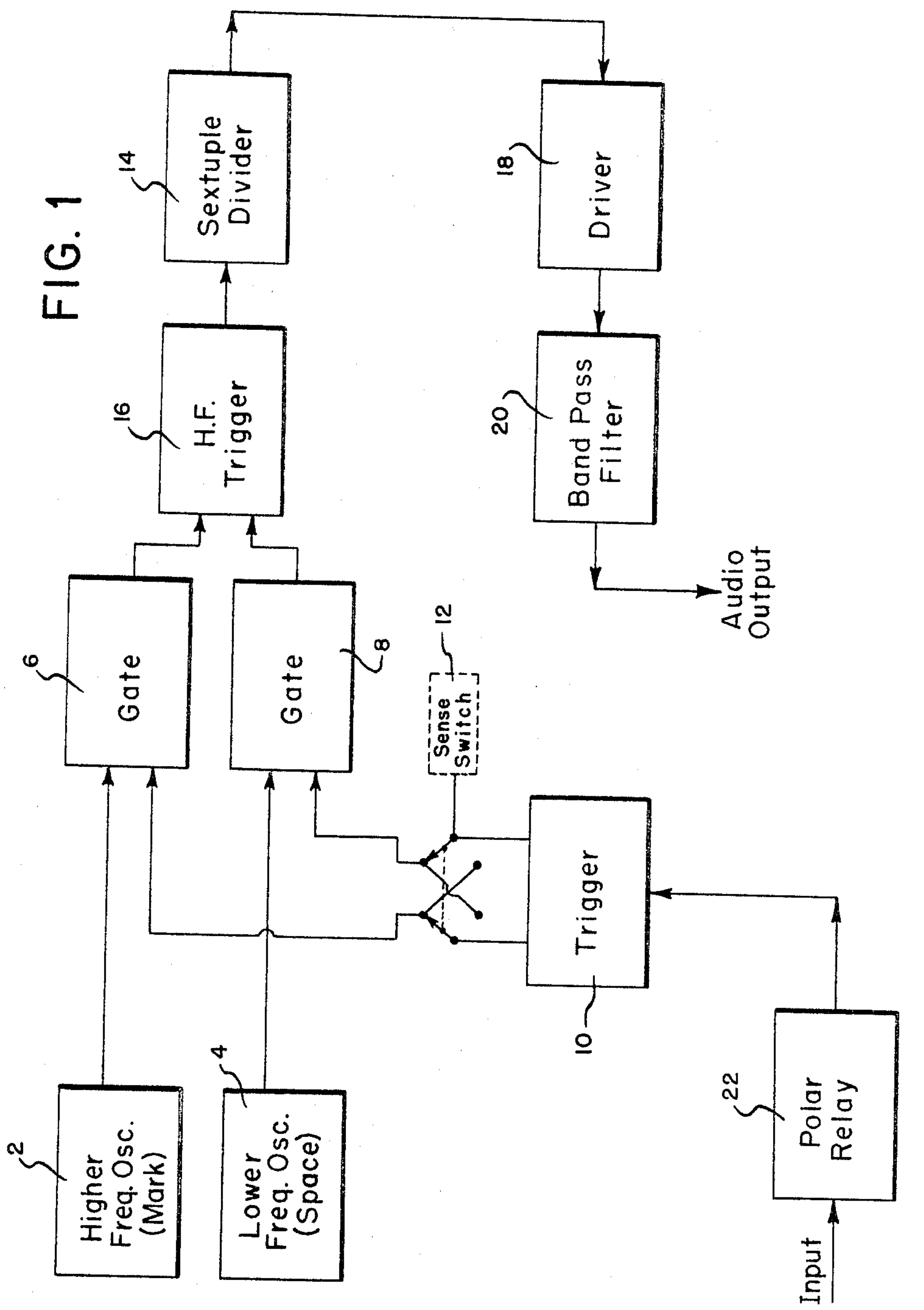

The present invention relates to telegraphy and more particularly to keying apparatus for the generation of short bursts or pulses of electrical oscillations at adjacent frequencies for use as the elements of telegraphic communication. Specifically, the invention provides a keyer which converts D.C. binary (i.e. two-level) signals into two different output audio frequencies.

It is known to operate a telegraphic type communication link (whether wired or wireless) by what is called frequency shift keying in which a carrier signal is shifted from one frequency to another, the separate frequencies serving to identify the separate, discrete signal levels or conditions of the link (usually two) of which telegraph communication is composed. It is customary to refer to these two conditions as the "mark" and "space" conditions, from the use of those terms in land-line telegraphy. For example, in teleprinter signalling systems there may be employed two signalling conditions, viz. "marks" (line current pulses) and "spaces" (no-line-current pulses). In such systems each character may include a fixed number of unit intervals, for example five, preceded by a "start pulse" in the form of a "space" and followed by a "stop pulse" in the form of "mark." The character is identified by the allocation of the five unit intervals between the "mark" condition (i.e. line current flowing) and the "space" condition (i.e. no line current flowing), thirty-two combinations being available when five unit intervals are provided for each character or code group. In frequency shift keying therefore one frequency is assigned to the marks and another to the spaces, quite irrespective of whether any "loop" or two-wire line is or is not employed in which the marks appear as line-current pulses and the spaces appear as no-line-current pulses.

Frequency shift keying requires that the frequency of a single source—an oscillator—be shifted from one frequency to another, and the phase at which oscillations commence, once the shift has been completed, is subject to substantial variation. This means that each "mark" pulse begins at an indeterminate phase of the cycle of the "mark" frequency, and the same is true of each "space" pulse. The resultant "jitter" is undesirable, reducing the dependability of transmission.

In contrast to such frequency shift keying in which the frequency of a single oscillator source is shifted from one value to another, the present invention provides two closely spaced and accurately controlled mark and space frequencies by employing the outputs of two crystal-controlled oscillators, passing the output of one oscillator at a time through gates controlled by the keying information, and combining the outputs of the gates into a frequency dividing network which brings the crystal oscillator frequencies down to the desired level, which may be in the audio range. The output of this dividing network (suitably filtered as necessary) comprises a succession of pulses of oscillations at two desired adjacent "mark" and "space" frequencies, suitable for use, for example, in modulating a telegraph transmitter. It is an advantage of the present invention that the variation in phase at which the pulses of mark and space oscillations delivered by the divider commence is very much less, in terms of fractions of the mark and space frequencies, than the variation in phase at which such pulses commence in a frequency shift keyer.

The phase, in the cycle of the crystal oscillator frequencies, at which the pulses of those frequencies are passed through the above-mentioned gates is subject to wide variation (as in the case of the output of a frequency shifted oscillator in the known frequency shift keyed systems). However, the phase at which the pulses of "mark" and "space" oscillations delivered by the divider network of the present invention commence is subject to very much less variation, the variation in phase being reduced by a factor substantially equal to the division ratio of the divider.

In a preferred embodiment of the invention, the frequency divider network includes a number of cascaded flip-flop circuits, each effecting division by two. The last of these stages has a substantially rectangular wave output whose repetition rate is that of the mark or space frequency desired, according to the condition of the gates at the output of the high frequency oscillators. This rectangular wave is put through a filter for extraction of a sine wave at the mark or space frequency, and the invention provides a coupling circuit between the last flip-flop and the filter whereby the filter sees a substantially constant source impedance throughout the rectangular wave cycle.

The invention will now be further described by reference to the accompanying drawings in which:

FIG. 1 is a block diagram of a keyer according to the invention; and

Figure 2A:
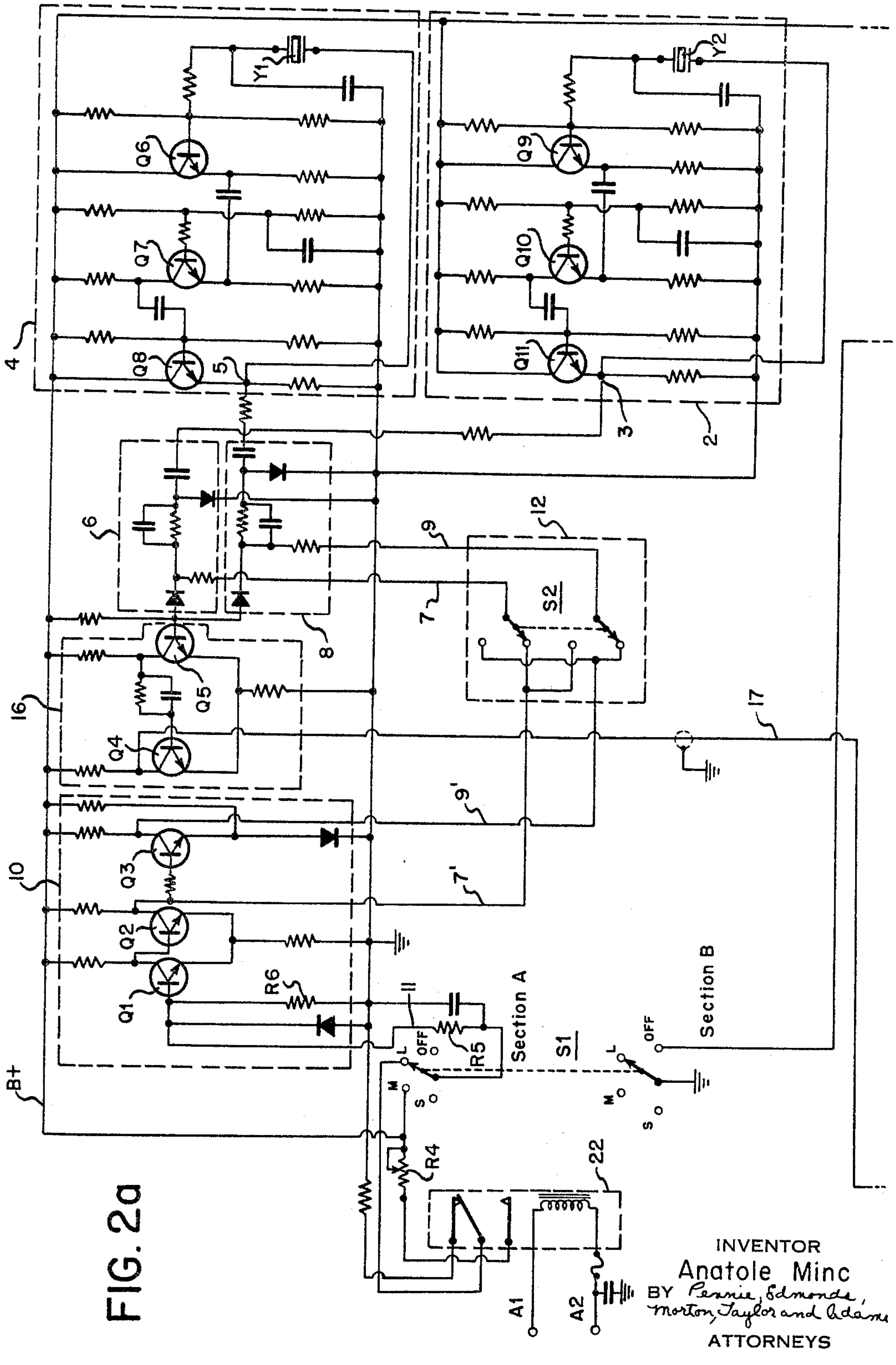
Figure 2B:
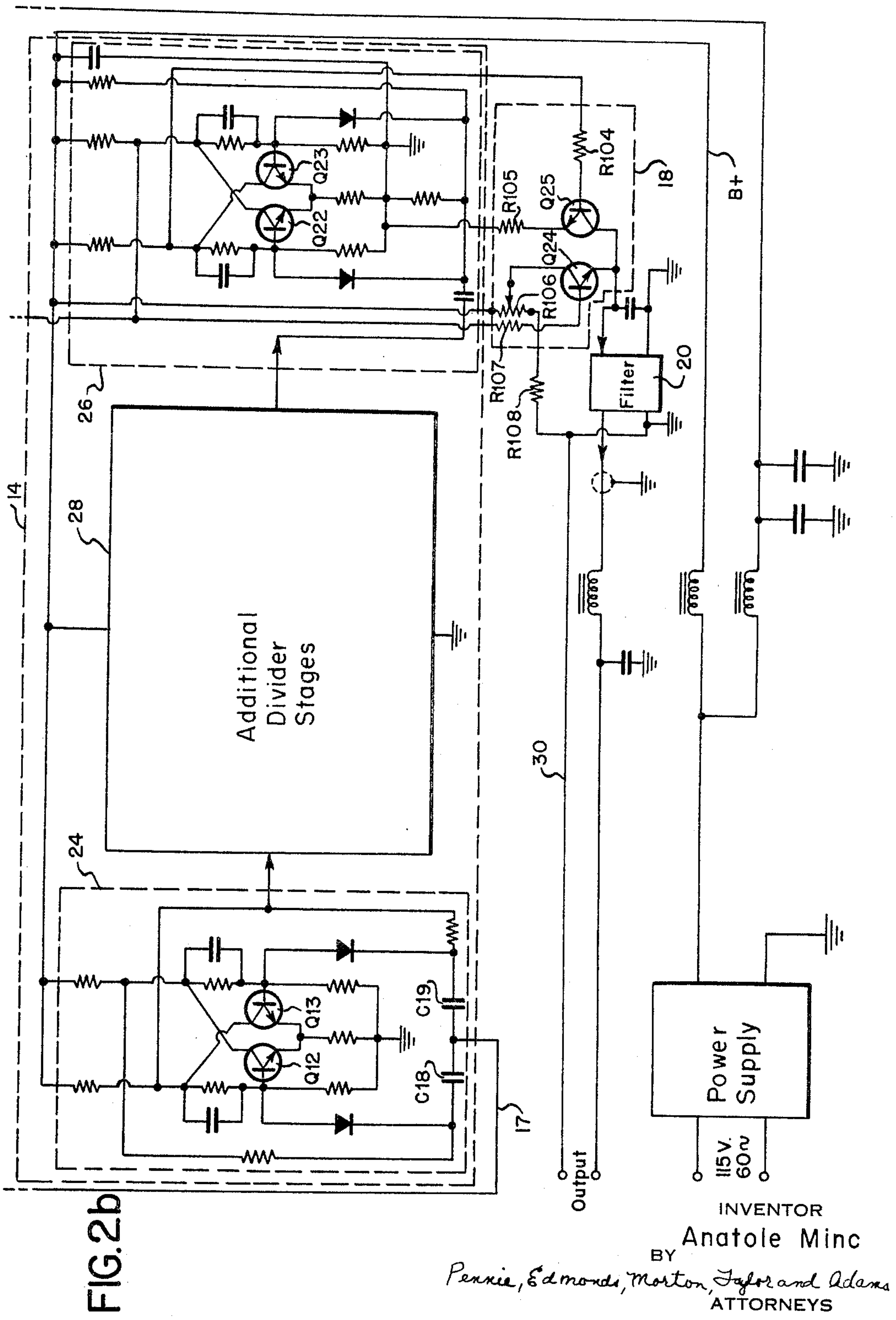

FIGS. 2*a* and 2*b* are a diagram, primarily schematic in form, of a presently preferred embodiment of the keyer of the invention.

Referring to FIG. 1, there are shown two crystal controlled oscillators 2 and 4. These oscillators generate A.C. voltages at two suitably spaced frequencies. For example, if the frequency divider 14 presently to be mentioned possesses a division ratio (input to output frequencies) of 64, and if the mark and space frequencies to be delivered by the keyer of the invention are 2425 c.p.s. and 1575 c.p.s., the oscillators 2 and 4 will operate at 155.2 kc. and 100.8 kc. respectively.

Keying signals of the on-off type are applied to a trigger circuit 10 which opens the gates 6 and 8 alternately, the mark condition opening gate 6 and closing gate 8, and the space condition opening gate 8 and closing gate 6. The outputs of the gates 6 and 8 are applied to a frequency dividing network 14, advantageously through a high frequency trigger circuit 16. The divider output is then passed through an amplifier 18 and a filter 20. The output of the filter 20 accordingly comprises a succession of pulses of two closely spaced audio frequencies which may be employed in any desired manner. For example, it may be employed by conventional methods to modulate some form of carrier signal generator apparatus in order to obtain signals suitable for delivery to a carrier type telegraph transmission line, either wired or wireless.

The keying signals may be supplied to trigger 10 from any suitable source. There is shown in FIG. 1 for this purpose a polarized relay 22, to which, of course, the keying information must be supplied. An inverting sense switch 12 is shown for interchanging the association of the oscillators 2 and 4 with the mark and space elements of the two level input information to trigger 10.

Referring to FIGS. 2*a* and 2*b*, the crystal-controlled oscillators 2 and 4 of FIG. 1 are indicated in FIG. 2*a* at correspondingly numbered dash-line boxes 2 and 4. They contain respectively crystals Y1 and Y2, having separate resonant frequencies F1 and F2 which are related to the desired output mark and space frequencies $f1$ and $f2$ by a common multiplying factor M given by the ratio of the input to output frequencies of the divider 14 (FIG. 2*b*). Thus $f1=F1/M$ and $f2=F2/M$.

The oscillators 2 and 4 contain respectively transistors Q9, Q10, Q11 and Q6, Q7, Q8 together with other appropriate circuit elements to deliver, at output conductors 3 and 5 connecting to the emitters of transistors Q11 and Q8, electric oscillations of the frequencies F1 and F2. The oscillators 2 and 4 may indeed be identical except as to the resonant frequencies of the crystals Y1 and Y2. Inasmuch as the particular oscillator circuit employed forms no part of the present invention per se, it will not be further described.

Conductors 3 and 5 lead to gates 6 and 8 respectively, indicated in FIG. 2*a* by correspondingly numbered dash-line boxes. For frequencies F1 and F2 not too widely spaced apart, the two gates may be identical in construction and components. Their outputs are combined at the base of transistor Q5, which with transistor Q4 and associated circuit elements makes up the high frequency trigger circuit 16 of FIG. 1.

The output of trigger circuit 16 appears at conductor 17, via which it is delivered to the frequency divider network 14 of FIG. 2*b*.

The gates 6 and 8 are actuated by means of substantially rectangular wave signals of the same frequency but opposite phase delivered to conductors 7 and 9 through an optional sense selection switch 12 from the trigger circuit 10.

The trigger circuit 10 comprises transistors Q1 and Q2 associated together in a Schmitt type trigger circuit, and a transistor Q3 functioning to invert the output signal of the Schmitt trigger, together with appropriate other circuit elements.

The input signal to circuit 10 is delivered at a conductor 11 in the form of a rectangular wave, the low potential portions thereof representing the mark condition and the high potential portions thereof representing the space condition.

In the embodiment of the invention illustrated in FIGS. 2*a* and 2*b*, binary (i.e. on-off) type keying signals are delivered to input terminals A1 and A2 which lead to the actuating coil of a polarized relay 22. When the voltage so applied across terminals A1, A2 is zero, relay 22 is deenergized. This leaves Q1 in its normal or biased-off condition, with a low voltage at the collector of Q2 (conducting) and a high voltage at the collector of the inverter transistor Q3 (non-conducting). These collectors are connected to the conductors 7 and 9 respectively by conductors 7′ and 9′ for the normal or "direct" setting of sense switch 12. With zero input voltage across terminals A1 and A2 therefore conductors 7 and 9 are at low and high voltages respectively, producing an open condition for gate 6 and a closed condition for gate 8. Under these circumstances therefore the output of oscillator 2, in the form of a substantially sinusoidal oscillation of frequency F1, is applied to the base of transistor Q5 in high frequency trigger circuit 16. The operation of trigger circuit 16 can be likened roughly to that of a monostable multivibrator, putting out from the collector of Q4 onto conductor 17 an asymmetrical square wave having a repetition rate equal to the frequency of the sine wave applied to the base of Q5.

The space intervals for which relay 22 is energized raise the voltage at the base of Q1 by connecting the resistors R4, R5 and R6 in series as a voltage divider between B+ and ground. This reverses the conduction phase of trigger circuit Q1, Q2, applying high and low potentials to conductors 7′ and 9′ and hence opening gate 8 and closing gate 6, to pass to high frequency trigger circuit 16 the output of oscillator 4.

Referring now to FIG. 2*b*, the frequency divider 14 is shown as comprising an input stage 24, an output stage 26, and one or more cascaded intermediate stages indicated in block diagram form at 28. In the embodiment illustrated, each stage effects division by a factor of two. The pulses at frequency F1 or F2 (according to the condition of gates 6 and 8) delivered by trigger circuit 16 to conductor 17 are differentiated on their decaying edges at capacitors C18 and C19. These deliver negative going pulses alternately to transistors Q12 and Q13. The divider stage 24 thus functions similarly to a bi-stable multivibrator, going through one complete cycle for each two input pulses applied to it at conductor 17.

The last divider stage 26 is followed by the output driver circuit 18, comprising the series-connected transistor pair Q24, Q25. The collectors of transistors Q22 and Q23 in the last divider stage connect through R107 and R104 to the bases of transistors Q24 and Q25. Q24 is connected as an emitter follower, and its collector derives positive voltage from a potentiometer R106, connected in series with R108 between B+ and ground.

On that phase of the cycle of divider stage 26 for which Q22 is cut off, Q24 conducts and drives the load (filter 20) with a current determined by the setting of R106. The output impedance during this half of the cycle of stage 26 (i.e. the source impedance for filter 20) is determined by Q24, and is largely independent of the setting of R106. Q25 draws negligible current.

During the other half of the cycle of stage 26, Q24 is cut off and no energy is delivered to the load. The clamping transistor Q25 conducts strongly however, and thus effectively connects R105 across the input filter 20. In this way, the driving source impedance for filter 20 may be held substantially constant, R105 being selected to have approximately the same value as the source impedance provided by Q24 while the latter is conducting. This is desirable for a linear network such as is used in the filter.

Filter 20 strips off the harmonics present in the square wave output of stage 26 and delivers to the output line 30 a substantially sinusoidal voltage of the frequency *f*1 or *f*2, according to the condition of gates 6 and 8.

The invention thus provides apparatus for the generation of successive pulses or bursts of electric oscillations of two (or more) frequencies by means of a corresponding number of crystal controlled oscillators. For each of these there is provided an AND gate such as gates 6 and 8, taking one input from its oscillator and another from the trigger circuit 10, and having its output, like that of the other such AND gates, delivered to the frequency divider via trigger 16. The divider advantageously comprises a plurality of scale-of-two counters in cascade. These provide square-wave outputs in opposite polarities, and in a preferred embodiment these outputs from the last counter in the cascade, i.e. from the last stage of the divider, are applied to the bases of two P-N-P type transistors (Q24, Q25 in FIG. 2*b*) connected in series with a resistor such as R105 across a variable source of potential. The junction between the emitter of the transistor at higher potential in this series connection and the collector of the other transistor is connected to a filter for the selection of the fundamental frequency component from one output of the last divider stage, and the other transistor serves as a clamp, conducting while the first is cut off, to present to the filter input the impedance of the series resistor, which may be made equal or substantially equal to the impedance presented by the first transistor while it is conducting.

While the invention has been described herein in terms of a preferred embodiment, the invention itself is not limited to the construction of that embodiment, the scope of the invention being rather set forth in the appended claims.

I claim:

1. Apparatus for the generation of successive pulses of electric oscillations of two frequencies comprising two crystal-controlled oscillators of different frequencies two AND gate circuits each having an input coupled to a separate one of said oscillators, means to develop a rectangular gating wave in opposite polarities from a two-level input signal, means coupling said gating wave in opposite polarities to each of said gates, an amplifier having an input coupled to the outputs of both of said gates, a plurality of scale-of-two counters connected in cascade, means connecting the output of said amplifier to the first of said counters, two N-P-N type transistors and a resistor connected in series across a source of potential difference with the emitter of one of said transistors connected to the collector of the other, means to apply out of phase output voltages from the last of said counters to the bases of said transistors, and a filter coupled across the series combination of said second transistor and resistor, said filter passing oscillations of the frequencies of said oscillators divided by twice the number of said counters.

2. Apparatus for the generation of successive pulses of electric oscillations of two frequencies comprising two oscillators, a plurality of bi-stable scale-of-two counters connected in cascade, gating means to connect said oscillators alternately and successively to the first of said counters, two transistors, a resistor, means connecting said transistors and resistor in series with one transistor between the other transistor and resistor, the series circuit of transistors and resistor being connected across a source of potential, means coupling out-of-phase outputs from the last of said stages to the bases of said transistors, and a filter coupled across the series combination of said one transistor and said resistor.

3. Apparatus for the generation of successive pulses of electric oscillations of two frequencies comprising two independent oscillators producing output signals of unlike frequencies, a plurality of cascaded counters, two gate circuits each coupling one of said output signals to the input of said plurality of counters, and means responsive to two-level input signals to control said gates in opposite phases with one of said gates being opened for one level of said input signals and the other of said gates being opened for the other level of said input signals.

4. Apparatus for deriving, from the oscillators of any one of plural pairs of independent oscillators of unlike first frequencies from zero frequency upwards, successive pulses of oscillations of two unlike second frequencies, said second frequencies being each related by the same integral submultiple to a separate one of said first frequencies, said apparatus comprising a pair of gates each having a signal input terminal, a signal output terminal and a control terminal; triggering means responsive to a two-level data input signal and coupled to the control terminals of said gates to control said gates in opposite phases with one of said gates being opened for one level of said input signal and the other of said gates being opened for the other level of said input signal; a plurality of cascaded scale-of-two counters, means coupling the signal output terminals of said gates to the input of said plurality of counters, and a low-pass filter coupled to the output of said cascaded scale-of-two counters, said filter discriminating against all frequencies substantially higher than the frequency of either of said oscillators divided by two raised to a power equal to said plurality.

References Cited by the Examiner

UNITED STATES PATENTS

| | | | |
|---|---|---|---|
| 2,448,336 | 8/1948 | Weiner | 328—154 |
| 3,021,481 | 2/1962 | Kalmus et al. | 328—133 |
| 3,031,527 | 4/1962 | Barton et al. | 320—30 |
| 3,102,238 | 8/1963 | Bosen | 325—163 |
| 3,158,810 | 11/1964 | Stone | 325—163 |
| 3,162,812 | 12/1964 | Stone | 331—17 |
| 3,205,441 | 9/1965 | Likel | 325—163 |

ARTHUR GAUSS, *Primary Examiner.*

J. S. HEYMAN, S. D. MILLER, *Assistant Examiners.*